US011255766B2

(12) United States Patent
Berlinger et al.

(10) Patent No.: US 11,255,766 B2
(45) Date of Patent: Feb. 22, 2022

(54) VIBRONIC SENSOR AND MEASURING ASSEMBLY FOR MONITORING A FLOWABLE MEDIUM

(71) Applicant: Endress + Hauser SE+Co. KG, Maulburg (DE)

(72) Inventors: Andrea Berlinger, Baden-Baden (DE); Ingo Buschke, Maulburg (DE); Christof Huber, Bern (CH); Peter Klofer, Steinen (DE); Sergej Lopatin, Lorrach (DE); Torston Pechstein, Radebeul (DE); Thomas Uehlin, Schopfheim (DE)

(73) Assignee: ENDRESS + HAUSER SE+CO. KG, Maulburg (DE)

( * ) Notice: Subject to any disclaimer, the term of this patent is extended or adjusted under 35 U.S.C. 154(b) by 815 days.

(21) Appl. No.: 16/061,489

(22) PCT Filed: Dec. 2, 2016

(86) PCT No.: PCT/EP2016/079523
§ 371 (c)(1),
(2) Date: Jun. 12, 2018

(87) PCT Pub. No.: WO2017/102370
PCT Pub. Date: Jun. 22, 2017

(65) Prior Publication Data

US 2020/0264087 A1 Aug. 20, 2020

(30) Foreign Application Priority Data

Dec. 17, 2015 (DE) .................... 10 2015 122 124.1

(51) Int. Cl.
*G01N 11/16* (2006.01)
*G01F 1/84* (2006.01)

(52) U.S. Cl.
CPC .......... *G01N 11/16* (2013.01); *G01F 1/8422* (2013.01); *G01F 1/8427* (2013.01)

(58) Field of Classification Search
CPC ...... G01N 11/16; G01F 1/8422; G01F 1/8427
(Continued)

(56) References Cited

U.S. PATENT DOCUMENTS 6,389,891 B1 5/2002 D'Angelico et al.

FOREIGN PATENT DOCUMENTS

CN 14 16522 A 5/2003
CN 10 2428357 A 4/2012
(Continued)

OTHER PUBLICATIONS

German Search Report, German PTO, Munich, Aug. 24, 2016.
(Continued)

*Primary Examiner* — John Fitzgerald
*Assistant Examiner* — Rodney T Frank
(74) *Attorney, Agent, or Firm* — Bacon & Thomas, PLLC

(57) ABSTRACT

A vibronic sensor for monitoring a flowable medium, comprising: an oscillator to which a medium surrounding the oscillator can be applied; at least one electromechanical transducer for exciting the oscillator to mechanical vibrations in accordance with driver signals and/or for outputting transducer signals that depend on vibrations of the oscillator; an operating and evaluating unit for providing the driver signals for driving the electromechanical transducer, for capturing the transducer signals, and for determining the presence, the density, and/or the viscosity of the medium in accordance with the transducer signals, wherein the operating and evaluating unit is designed to detect whether the medium in the pipe has a flow velocity above a limit value on the basis of time-varying modifications of the transducer signals.

11 Claims, 3 Drawing Sheets

1
12
F
22
20
10
16

(58) Field of Classification Search
USPC ........................................................ 73/54.41
See application file for complete search history.

(56) References Cited

FOREIGN PATENT DOCUMENTS

| | | | |
|---|---|---|---|
| CN | 10 4011528 | A | 8/2014 |
| CN | 10 2348958 | B | 10/2014 |
| DE | 33 36 991 | A1 | 5/1985 |
| DE | 100 50 299 | A1 | 4/2002 |
| DE | 100 57 974 | A1 | 5/2002 |
| DE | 10 2006 033 819 | A1 | 1/2008 |
| DE | 10 2006 047 815 | A1 | 4/2008 |
| DE | 10 2007 008 669 | A1 | 8/2008 |
| DE | 10 2011 075 113 | A1 | 11/2012 |
| DE | 10 2015 122 124 | A1 | 6/2017 |
| EP | 2 667 162 | A1 | 11/2013 |
| TW | 2013 50845 | A | 12/2013 |
| WO | 97 26512 | A1 | 7/1997 |
| WO | 2008/009522 | A1 | 1/2008 |
| WO | 2010/126358 | A1 | 11/2010 |

OTHER PUBLICATIONS

International Search Report, EPO, The Netherlands, Feb. 10, 2017.
Office Action dated Aug. 1, 2019, issued in corresponding Chinese application No. 201680074347.8.

VIBRONIC SENSOR AND MEASURING ASSEMBLY FOR MONITORING A FLOWABLE MEDIUM

TECHNICAL FIELD

The present invention relates to a vibronic sensor and a measuring assembly for monitoring a flowable medium. In process installations, flowable media are often monitored with the aid of vibronic sensors which are used as limit-level switches or density or viscosity sensors. A limit-level switch comprises an oscillator, e.g., in the form of a rod or an oscillating fork, and detects the presence of a medium via a change in the resonance frequency of the oscillator due to the density of the surrounding medium. Furthermore, the density of the medium may be determined via measurement of the resonance frequency of the oscillator, or the viscosity of the medium may be determined via the attenuation. Such vibronic sensors are distributed by the applicant under the designation, LIQUIPHANT.

BACKGROUND DISCUSSION

The published German patent application, DE 33 36 991A1 discloses such a vibronic sensor for the monitoring of a fill-level, wherein the oscillator of the sensor has two vibrating rods projecting into the medium that are excited with a piezo-stack to bending vibrations.

The published German patent application, DE 100 57 974 A1 discloses a vibronic sensor and an operating method therefor for monitoring the fill-level of a medium, or for determining the density of the medium. The influence of disturbance variables on the vibration frequency of the vibronic sensor is determined and compensated accordingly.

The published German patent application, DE 100 50 299 A1 discloses a vibronic sensor for determining the viscosity of a medium in a container with an excited oscillator, wherein the viscosity of the medium is determined using a frequency/phase curve of the oscillator.

The published German patent application, DE 10 2006 033 819 A1 discloses a vibronic sensor for determining the density of a medium, with an excitation/reception unit which excites an oscillator to mechanical vibration and which receives the mechanical vibrations, with an electronic unit which charges the excitation/reception unit with an electrical excitation signal, and which receives an electrical reception signal from the excitation/reception unit, wherein the electronic unit generates the excitation signal such that a phase difference equal to a nominal value of a phase difference results between the reception signal and the excitation signal, in which nominal value of a phase difference effects of changes in the viscosity of the medium on the mechanical vibrations of the unit capable of mechanical vibrations are negligible, and the nominal value of the phase difference is provided as a function of the ratio of the impedance of the excitation/reception unit to the input impedance of the electronic unit.

The above vibronic sensors and the evaluation methods used have previously assumed a medium at rest. In any event, a relative movement between the medium and the sensor has previously not been taken to be a degree of freedom that is considered by the sensor.

SUMMARY OF THE INVENTION

The present invention is based upon the aim of providing a vibronic sensor and a measuring assembly with such a sensor that are suitable for detecting a flowing medium. The aim is achieved by a vibronic sensor.

The vibronic sensor according to the invention for the monitoring of a flowable medium comprises:

an oscillator, to which a medium surrounding the oscillator can be applied;

at least one electromechanical transducer for exciting the oscillator to mechanical vibrations as a function of driver signals, and/or for outputting transducer signals that depend upon vibrations of the oscillator;

an operating and evaluating unit for providing the driver signals for driving the electromechanical transducer, for capturing the transducer signals, and for determining the presence, the density, and/or the viscosity of the medium as a function of the transducer signals;

characterized in that the operating and evaluating unit is set up to detect whether the medium in the pipe has a flow velocity above a limit value, on the basis of time-variable modifications of the transducer signals.

The invention is based upon the idea that the oscillator forms a flow obstruction at which, in a flowing medium, eddies, due to which the vibration response of the oscillator is influenced, separate. The phenomenon is already used in vortex meters which, at a first approximation, detect velocity-proportional separation frequency of the of eddies at a flow obstruction by means of a passive paddle that is deflected by the eddies. A vortex meter is, for example, described in German patent, DE 10 2006 047 815 A1. For fluids, the vortex frequency amounts to up to, for example, approximately 200 Hz, depending upon flow velocity and geometric conditions. The amplitude of the pressure fluctuations due to the eddies is, at a first approximation, proportional to the square of the flow velocity. Therefore, a measurable superposition of the resonator vibrations of the oscillator with forced vibrations due to the eddies is to be expected with increasing flow rate.

In one development of the invention, the oscillator has an oscillating fork, a paddle, or a rod.

In one development of the invention, the time-variable modifications of the transducer signals are periodic, given a constant flow velocity of the medium above the limit value.

In one development of the invention, the oscillator has a resonance frequency which depends upon the density of the medium in the pipe, wherein the limit value for the flow velocity is selected so that the frequency of the periodic modifications, for a flow velocity that corresponds to the limit value, is not more than one-fourth—in particular, not more than one-eighth—of the resonance frequency of the oscillator.

In one development of the invention, the operating and evaluating unit is set up to determine values for at least one characteristic quantity of the vibrations of the oscillator, using the transducer signals of multiple vibration periods of the oscillator, and to perform a statistical analysis of the values of the at least one characteristic quantity, in order to detect the modifications of the transducer signals, wherein the characteristic quantity is selected from the frequency of the transducer signals, a period of the transducer signals, an amplitude of the transducer signals, or a phase relationship between the driver signals and the transducer signals.

In one development of the invention, the statistical analysis includes determining the range of a distribution of the values of the characteristic quantity.

In one development of the invention, the statistical analysis includes determining the mean deviation between successive values of the characteristic quantity.

In one development of the invention, the operating and evaluating unit comprises a microprocessor which is, in particular, set up to perform the above statistical analyses on digitized transducer signals, to establish and signal, a flow rate, and, if applicable, to determine and output an associated flow-rate measurement value.

The measuring assembly according to the invention comprises a vibronic sensor according to the invention and a pipe, wherein the vibronic sensor—in particular, the oscillator of the vibronic sensor—protrudes into the pipe.

In one development of the invention, the pipe has a pipe wall, wherein the vibronic sensor protrudes through a segment of the pipe wall, and, essentially orthogonal to said pipe wall, into the pipe.

In one development of the invention, the oscillator can be excited essentially at right angles to the segment of the pipe wall.

In one development of the invention, the oscillator can be excited to vibration essentially at right angles to the longitudinal axis of the measurement pipe. In an alternative development of the invention, the oscillator can be excited to vibration essentially parallel to the longitudinal axis of the measurement pipe. The excitement in different directions leads to different sensitivities with respect to the flow rate.

In one development of the invention, the operating and evaluating unit has a data storage in which is stored a model that describes a link, specific to the measuring assembly, between the flow rate and the time-variable modifications of the transducer signals for at least one medium.

BRIEF DESCRIPTION OF THE DRAWINGS

The invention is explained in the following in further detail on the basis of the exemplary embodiments shown in the figures. These show.

DETAILED DISCUSSION IN CONJUNCTION WITH THE DRAWINGS

Figure 1:
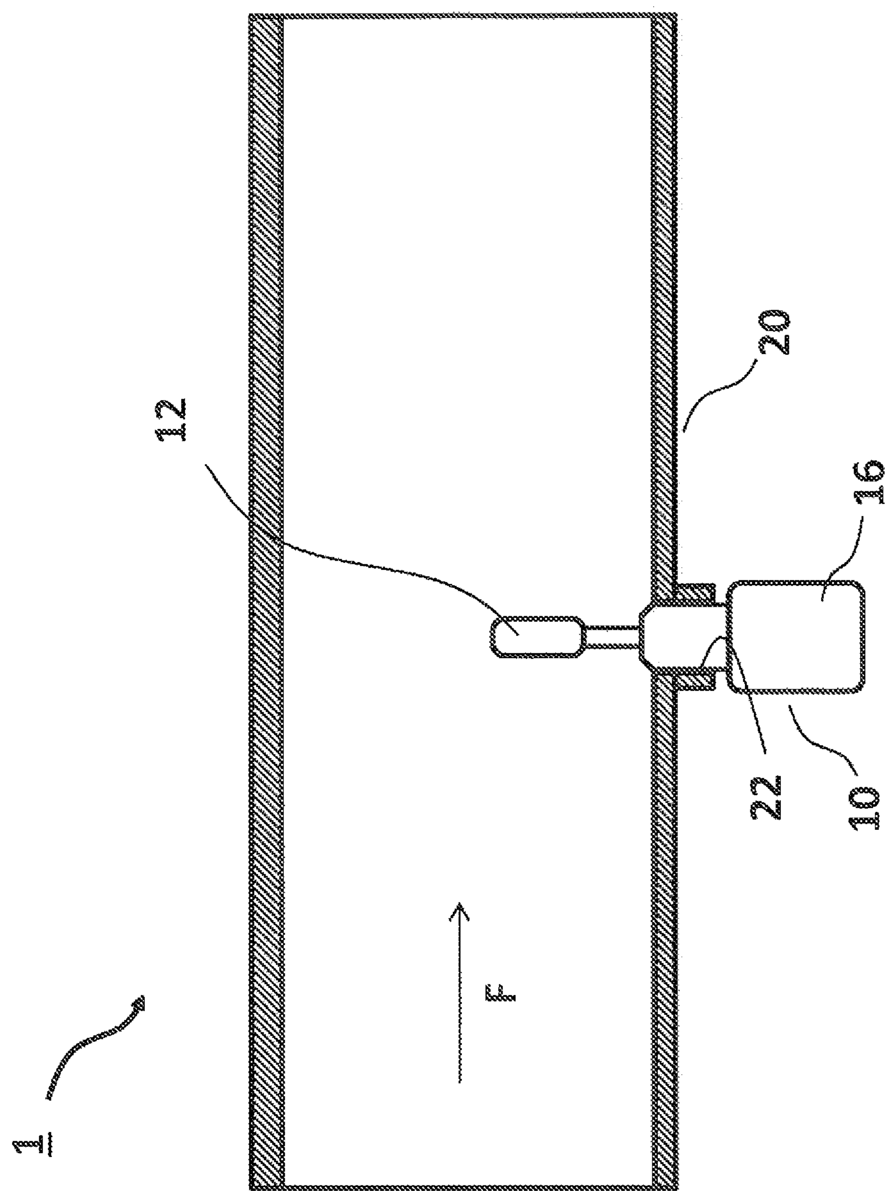
FIG. 1: is a schematic representation of a first exemplary embodiment of a measuring assembly according to the invention.
Figure 2B:
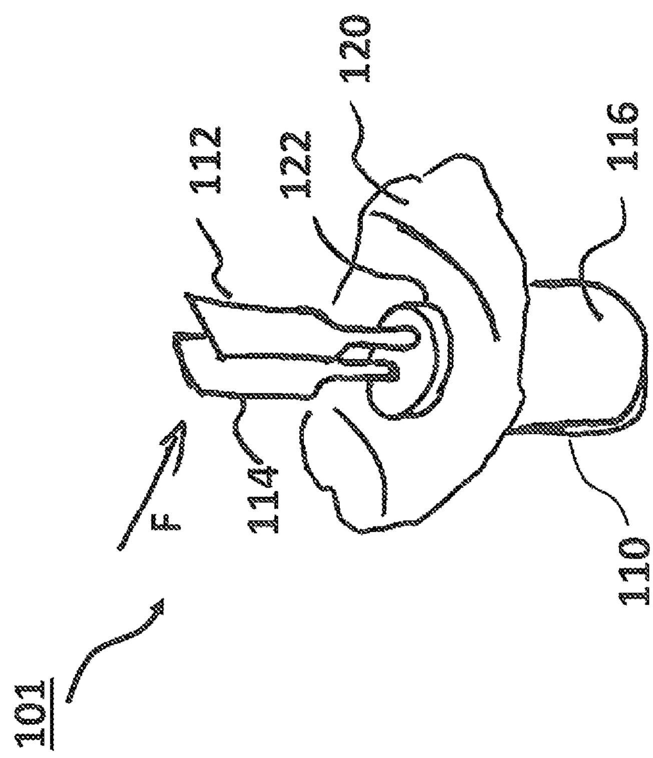
FIG. 2*b*: is a detail of a second exemplary embodiment of a measuring assembly according to the invention.
Figure 2A:
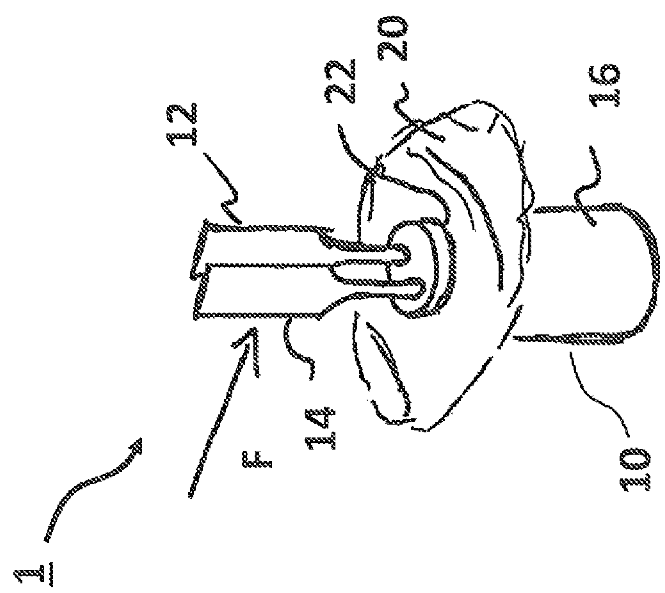
FIG. 2*a*: is a detail of the first exemplary embodiment of a measuring assembly according to the invention.

The exemplary embodiment 1 of a measuring assembly according to the invention as depicted in FIGS. 1 and 2*a* comprises a vibronic sensor 10 that has an oscillator with two paddles 12, 14 vibrating counter to one another. The vibration properties of the oscillator are dependent, in particular, upon the density and the viscosity of a medium surrounding the oscillator. The vibronic sensor further comprises at least one electromechanical transducer—in particular, a piezoelectric transducer—for exciting vibrations and supplying vibration-dependent transducer signals. In addition to this, the vibronic sensor comprises an operating and evaluating unit, which outputs driver signals to the at least one electromechanical transducer for exciting the vibrations of the oscillator, and which detects and evaluates the transducer signals in order—depending upon the field of use—to output vibration-dependent measurement and/or switching signals in analog form as current or a voltage signal, or in digital form. The operating and evaluating unit is arranged in a housing 16. The measuring assembly 1 further comprises a measurement pipe 10 into which the paddles 12, 14 of the oscillator protrude through a pipe wall opening 22. As depicted, in particular, in FIG. 2*a*, the paddles 12, 14 have paddle faces that run essentially parallel to the flow direction F, or to the pipe axis. The paddles 12, 14 vibrate counter to one another, and thus orthogonal to the flow direction F.

The second exemplary embodiment 101 of a measuring assembly according to the invention, as depicted in FIG. 2*b*, comprises a vibronic sensor 110 that has an oscillator with two paddles 112, 114 vibrating counter to one another. The vibration properties of the oscillator are dependent, in particular, upon the density and the viscosity of a medium surrounding the oscillator. The vibronic sensor further comprises at least one electromechanical transducer—in particular, a piezoelectric transducer—for exciting vibrations and supplying vibration-dependent transducer signals. In addition to this, the vibronic sensor comprises an operating and evaluating unit which outputs driver signals to the at least one electromechanical transducer for exciting the vibrations of the oscillator, and which detects and evaluates the transducer signals in order—depending upon the field of use—to output vibration-dependent measurement and/or switching signals in analog form as current or a voltage signal, or in digital form. The operating and evaluating unit is arranged in, a housing 116; it contains a microprocessor for performing statistical analyses on digitized transducer signals. The measuring assembly 101 further comprises a measurement pipe 110 into which the paddles 112, 114 of the oscillator protrude through a pipe wall opening 122, wherein the paddles 112, 114 have paddle faces that run essentially at right angles to the flow direction F, or to the pipe axis. The paddles 112, 114 vibrate counter to one another, and thus parallel to the flow direction F.

Figure 3:
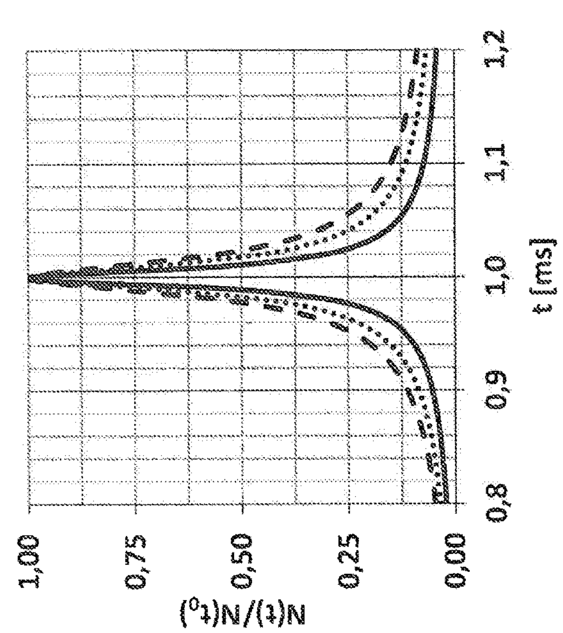
FIG. 3: is a presentation of the evaluation principle for the establishment and determination of flow rate.

The procedure for detecting or measuring flow rate is now explained using FIG. 3. An essential measurand of vibronic sensors is the resonance frequency of the oscillator, which is dependent, in particular, upon the density of the surrounding medium. A typical rating of an oscillator in water is 70, for example, such that the resonance line is very sharp. However, if a medium, flows through the measurement pipe, it leads to the disturbances noted above, due to eddy separations at the paddles 12, 14 of the vibronic sensors. They lead to fluctuating oscillation periods. If the respective period duration is now detected over multiple oscillation periods, e.g., by detecting the time difference between maxima of the transducer signals, using the distribution of the period durations, it can be established whether the medium flows, and possibly at what velocity. For this, the period durations of, for example, 50 to 100 periods may be detected, and their relative frequency $N(t)/N(t_0)$ is determined. Distributions in this regard are presented in FIG. 3. While the curve A shows the distribution for a resting medium, curves B and C correspond to the distributions for flow-rate velocities of a few m/s. The half-width (WNHM) at $N(t)/N(t_0)=0.5$, where $t_0$ is the mean period duration, increases with rising flow rate.

Figure 4:
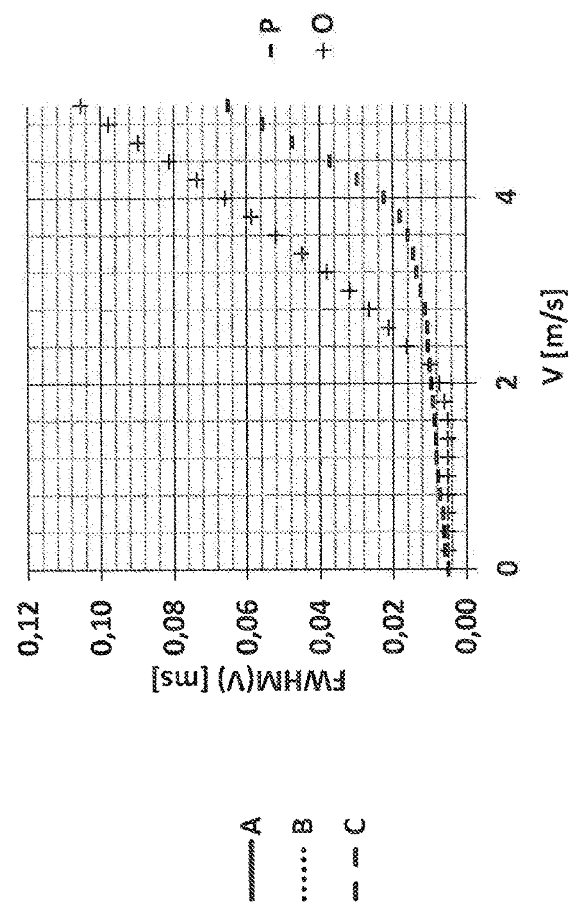
FIG. 4: shows data regarding the flow rate-dependent half-width of one of the distributions of the period duration.

FIG. 4 presents the flow rate-dependent half-width as a function of the flow rate for the exemplary embodiments from FIGS. 2*a* and 2*b*. The symbols labeled with P correspond to the function for paddle faces (FIG. 2*a*) aligned parallel to the flow direction, whereas the symbols labeled with O represent the curve of the half-width for paddle faces (FIG. 2*b*) arranged orthogonal to the flow direction. It is shown that, in the exemplary embodiments considered, given a low flow rate the parallel alignment already allows an increase in the half-width to be detected, whereas the orthogonal alignment shows a distinctly detectable spreading only at or above a flow rate of approximately 2 m/s, which, however, then increases more starkly with increasing flow rate than the half-width, given parallel alignment of the paddle faces.

For a given vibronic sensor, the precise relationship between half-width and flow rate depends, on the one hand, upon the media properties and, on the other hand, upon geometric conditions of the respective measuring assembly. Specific corresponding modelings, which describe the correlation between half-width of the distribution of the period duration of the oscillator vibrations and the flow rate of a medium.

The invention claimed is:

1. A vibronic sensor for monitoring a flowable medium, comprising: an oscillator to which a medium surrounding the oscillator can be applied; at least one electromechanical transducer for exciting said oscillator to mechanical vibrations in accordance with driver signals, and/or for outputting transducer signals that depend upon vibrations of said oscillator; and an operating and evaluating unit for providing the driver signals for driving said at least one electromechanical transducer, for capturing the transducer signals, and for determining the presence, the density, and/or the viscosity of the medium in accordance with the transducer signals, wherein: said oscillator has an oscillating fork, a paddle, or a rod; the oscillator forms a flow obstruction at which, in a flowing medium, eddies, due to which a vibration response of the oscillator is influenced, separate with a velocity-proportional separation frequency of the of eddies; an amplitude of pressure fluctuations due to the eddies is, at a first approximation, proportional to the square of the flow velocity; a measurable superposition of the resonator vibrations of the oscillator with forced vibrations due to the eddies occurs with increasing flow rate, thereby yielding periodic time-variable modifications of the transducer signals, given a constant flow velocity of the medium above a limit value; the operating and evaluating unit is set up to determine values for at least one characteristic quantity of the vibrations of the oscillator, using the transducer signals of multiple vibration periods of the oscillator, and to perform a statistical analysis of the values of the at least one characteristic quantity, in order to detect said periodic modifications of the transducer signals, wherein the characteristic quantity is selected from the frequency of the transducer signals, a period of the transducer signals, an amplitude of the transducer signals, or a phase relationship between the driver signals and the transducer signals; the statistical analysis includes determining one of a width of a distribution of the values of the characteristic quantity; or a mean deviation between successive values of the characteristic quantity; said operating and evaluating unit is set up to detect whether the medium in the pipe has a flow velocity above said limit value on the basis of said statistical analysis of said time-variable modifications of said transducer signals.

2. The vibronic sensor according to claim 1, wherein:
the statistical analysis includes determining the mean deviation between successive values of the characteristic quantity.

3. The vibronic sensor according to claim 1, wherein:
said operating and evaluating unit has a microprocessor which is set up to perform the above statistical analyses on digitized transducer signals, to establish and signal a flow rate, and, if applicable, to determine and output an associated flow-rate measurement value.

4. A measuring assembly, comprising: a pipe; and a vibronic sensor for monitoring a flowable medium, comprising: an oscillator to which a medium surrounding the oscillator can be applied; at least one electromechanical transducer for exciting said oscillator to mechanical vibrations in accordance with driver signals, and/or for outputting transducer signals that depend upon vibrations of said oscillator; and an operating and evaluating unit for providing the driver signals for driving said at least one electromechanical transducer, for capturing the transducer signals, and for determining the presence, the density, and/or the viscosity of the medium in accordance with the transducer signals, wherein: said oscillator has an oscillating fork, a paddle, or a rod; the oscillator forms a flow obstruction at which, in a flowing medium, eddies, due to which a vibration response of the oscillator is influenced, separate with a velocity-proportional separation frequency of the of eddies; an amplitude of pressure fluctuations due to the eddies is, at a first approximation, proportional to the square of the flow velocity; a measurable superposition of the resonator vibrations of the oscillator with forced vibrations due to the eddies occurs with increasing flow rate, thereby yielding periodic time-variable modifications of the transducer signals, given a constant flow velocity of the medium above a limit value; the operating and evaluating unit is set up to determine values for at least one characteristic quantity of the vibrations of the oscillator, using the transducer signals of multiple vibration periods of the oscillator, and to perform a statistical analysis of the values of the at least one characteristic quantity, in order to detect said periodic modifications of the transducer signals, wherein the characteristic quantity is selected from the frequency of the transducer signals, a period of the transducer signals, amplitude of the transducer signals, or a phase relationship between the driver signals and the transducer signals; the statistical analysis includes determining one of a width of a distribution of the values of the characteristic quantity; or a mean deviation between successive values of the characteristic quantity; said operating and evaluating unit is set up to detect whether the medium in the pipe has a flow velocity above said limit value on the basis of said statistical analysis of said time-variable modifications of said transducer signals; and said vibronic sensor protrudes into the pipe.

5. The measuring assembly according to claim 4, wherein:
the pipe has a pipe wall;
the vibronic sensor protrudes through a segment of said pipe wall, and essentially orthogonal to said pipe wall, into the pipe.

6. The measuring assembly according to claim 5, wherein:
the oscillator can be excited to vibration essentially at right angles to the segment of said pipe wall.

7. The measuring arrangement according to claim 5, wherein:
the oscillator can be excited to vibration essentially at right angles to the longitudinal axis of said measurement pipe.

8. The measuring assembly according to claim 5, wherein:
the oscillator can be excited to vibration essentially parallel to the longitudinal axis of said measurement pipe.

9. The measuring assembly according to claim 4, wherein:
the operating and evaluating unit has a data storage in which is stored a model that describes a link, specific to the measuring assembly, between the flow rate and the time-variable modifications of the transducer signals for at least one medium.

10. The vibronic sensor according to claim 1, wherein: said oscillator has a resonance frequency which depends upon the density of the medium; and the limit value for the flow velocity is selected so that the frequency of the periodic modifications, given a flow velocity that corresponds to the limit value, is not more than one-fourth of the resonance frequency of the oscillator.

11. The vibronic sensor according to claim 1, wherein: said oscillator has a resonance frequency which depends upon the density of the medium; and the limit value for the flow velocity is selected so that the frequency of the periodic modifications, given a flow velocity that corresponds to the limit value, is not more than one-eighth of the resonance frequency of the oscillator.

* * * * *